Sept. 15, 1964 W. E. THORNTON 3,149,328
RADIANT ENERGY OBJECT LOCATING SYSTEM
Filed March 7, 1960 6 Sheets—Sheet 1
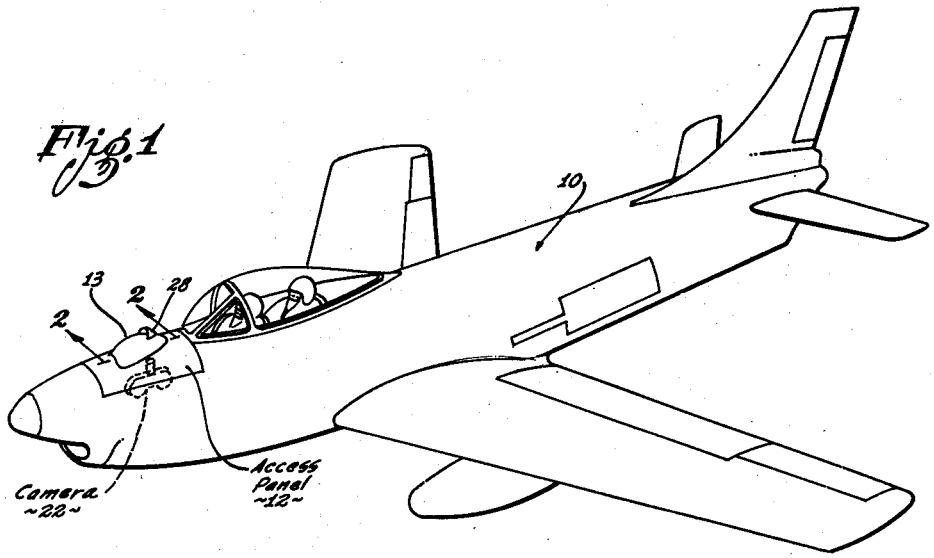
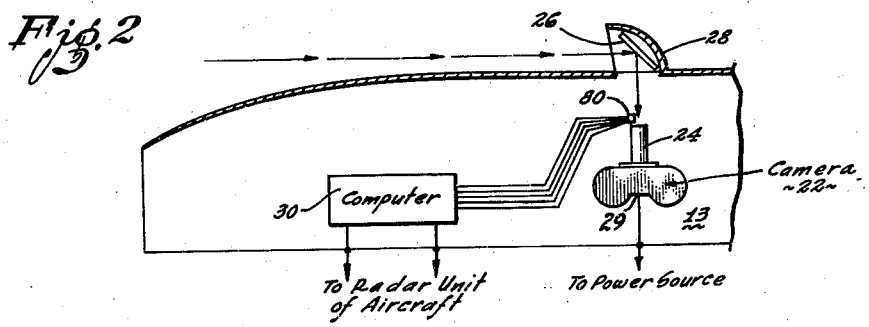
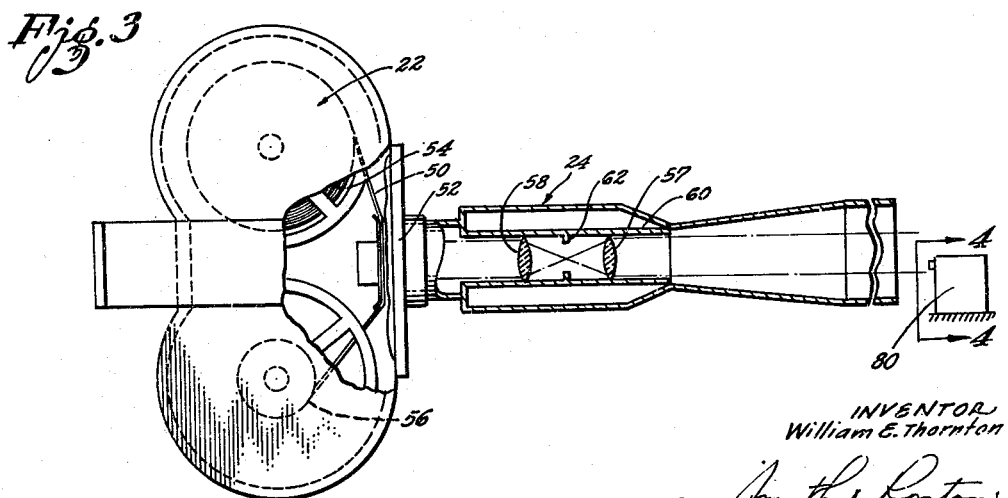
INVENTOR
William E. Thornton

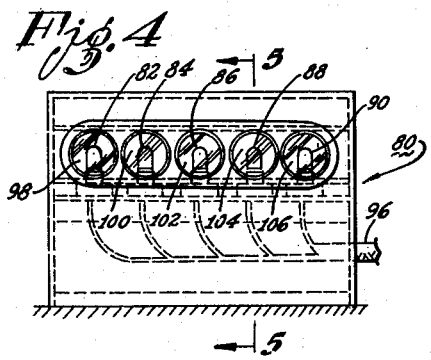
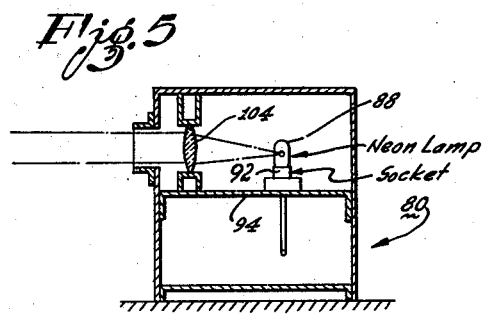
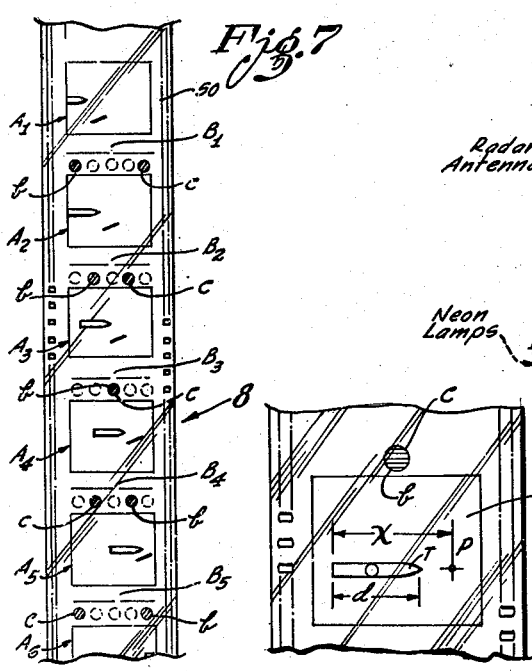
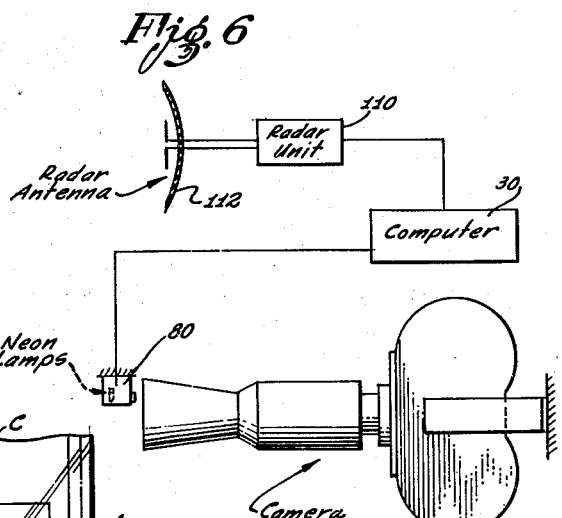
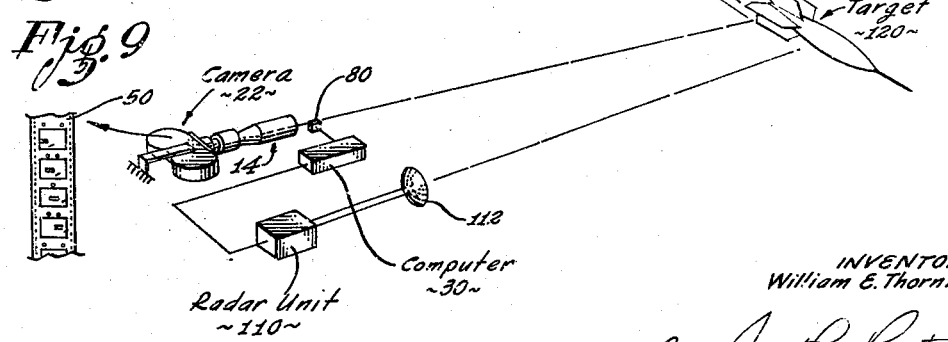

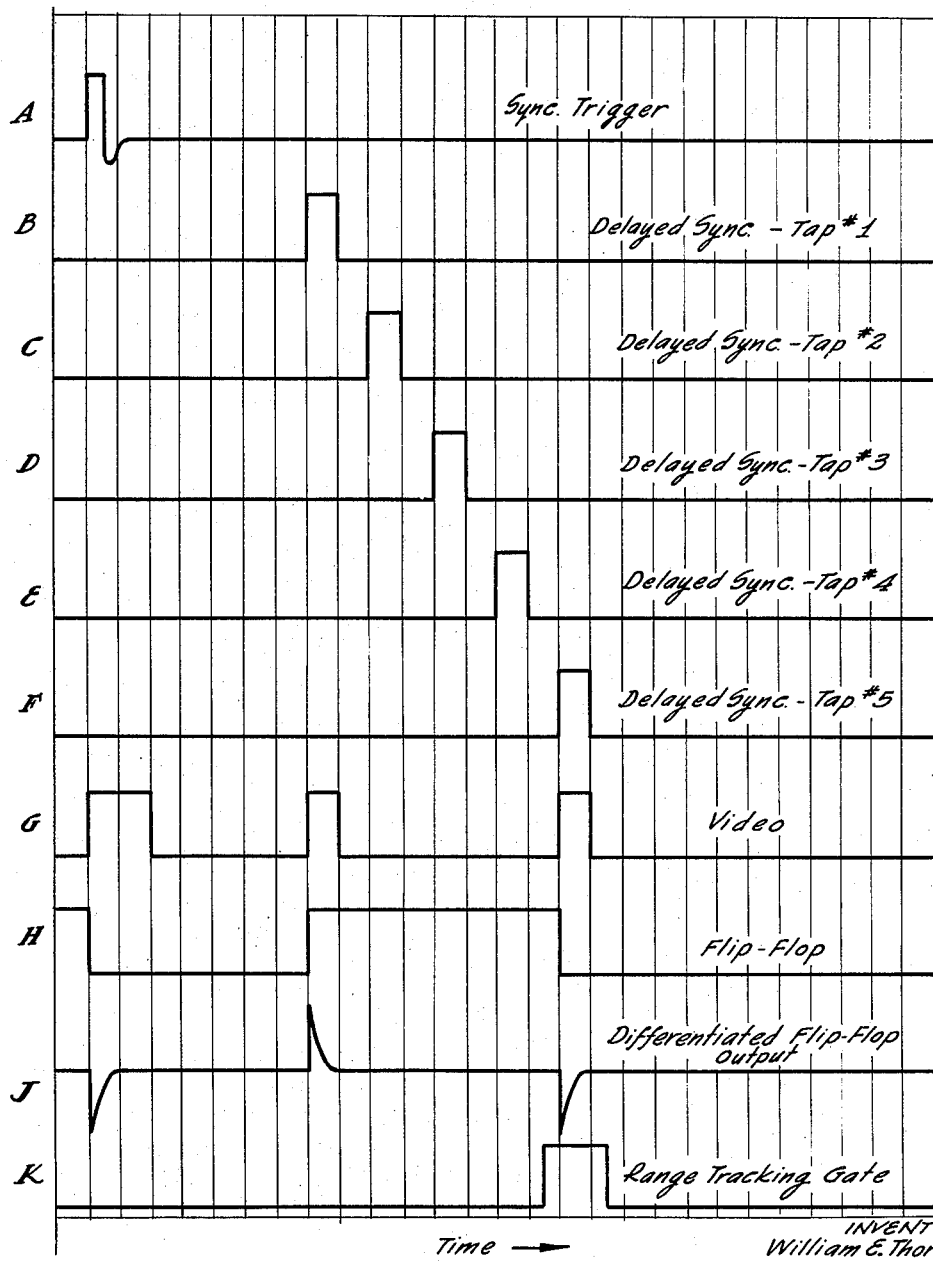

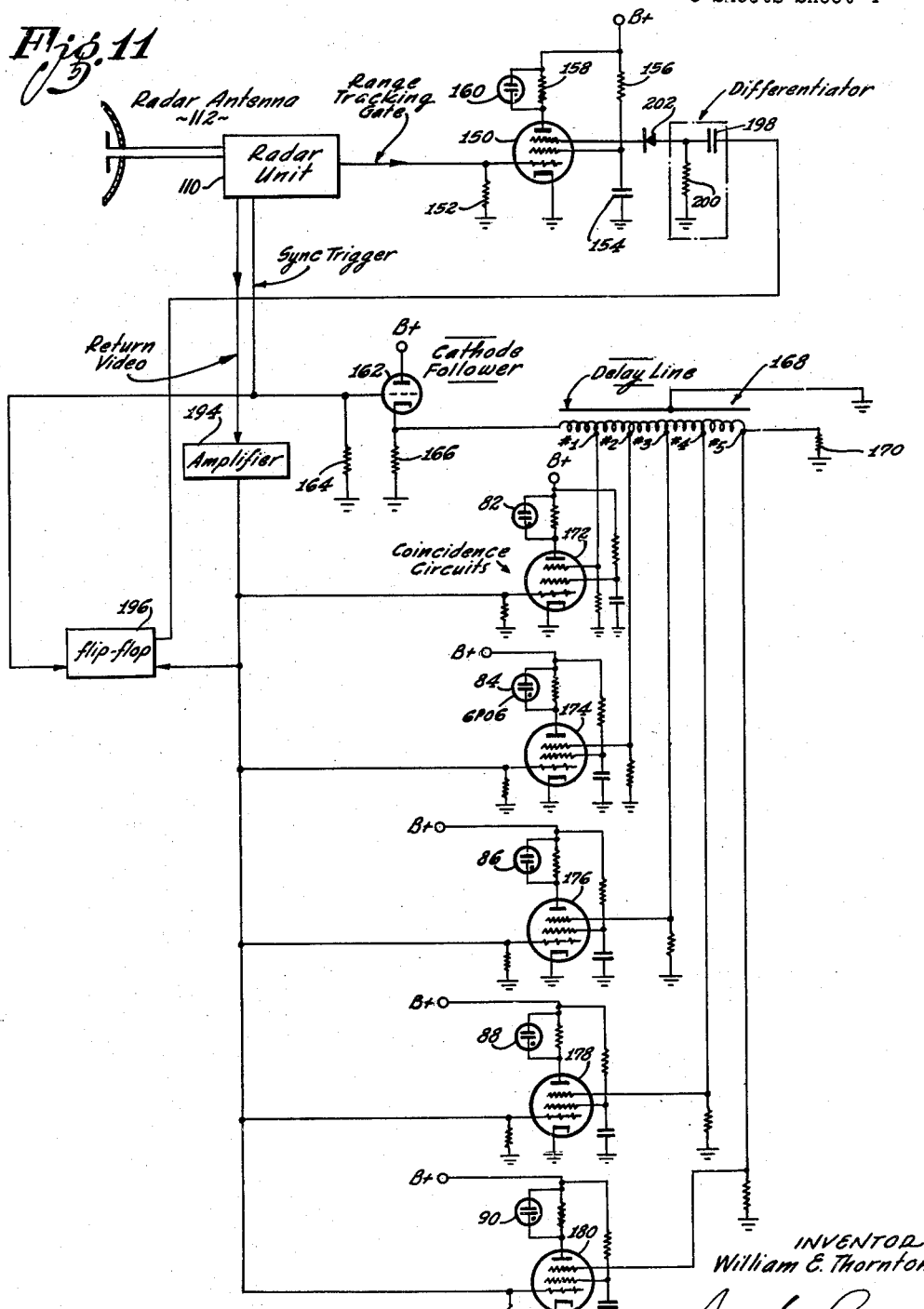

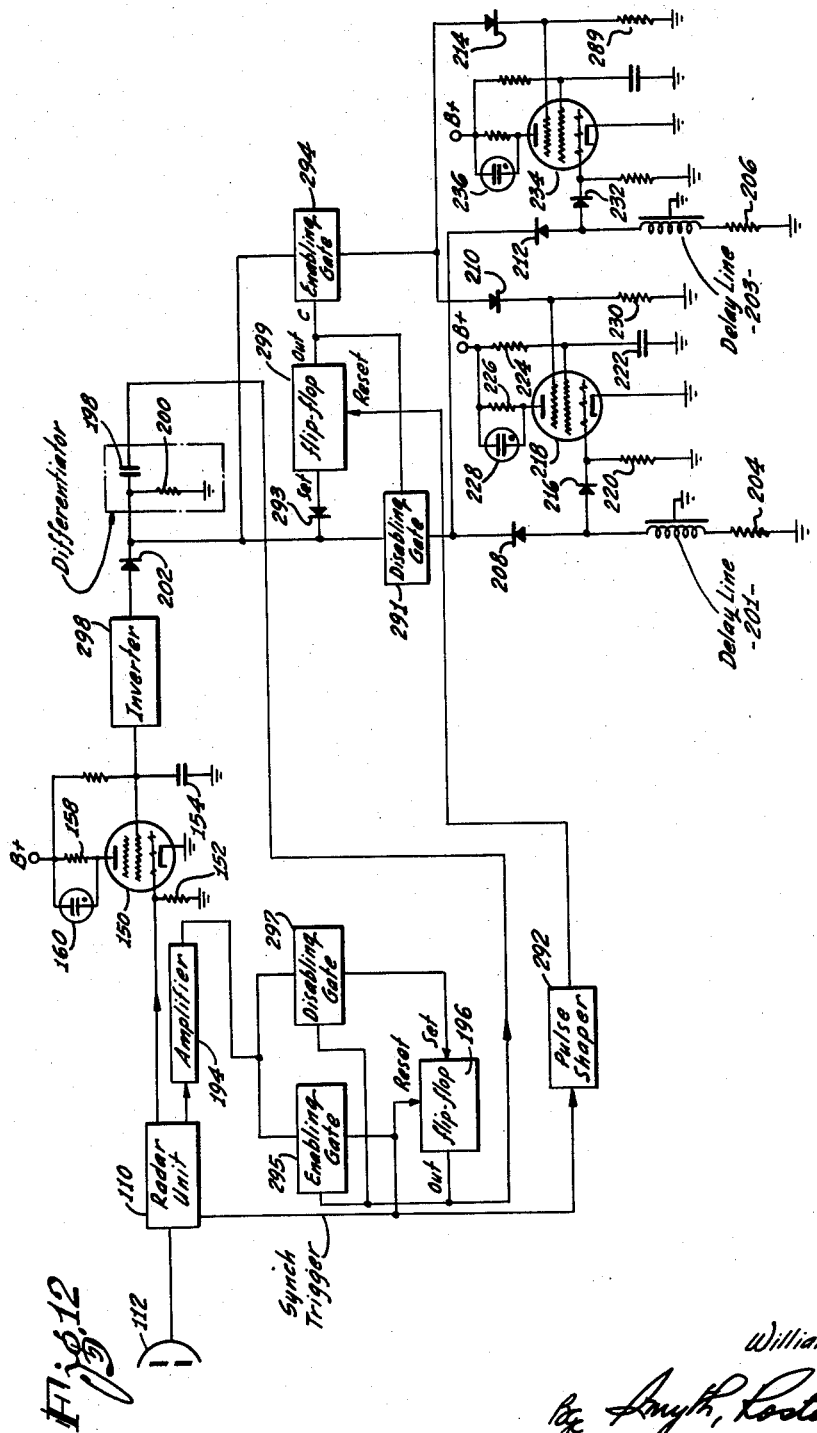

Sept. 15, 1964　　　W. E. THORNTON　　　3,149,328
RADIANT ENERGY OBJECT LOCATING SYSTEM
Filed March 7, 1960　　　　　　　　　　　　6 Sheets-Sheet 6
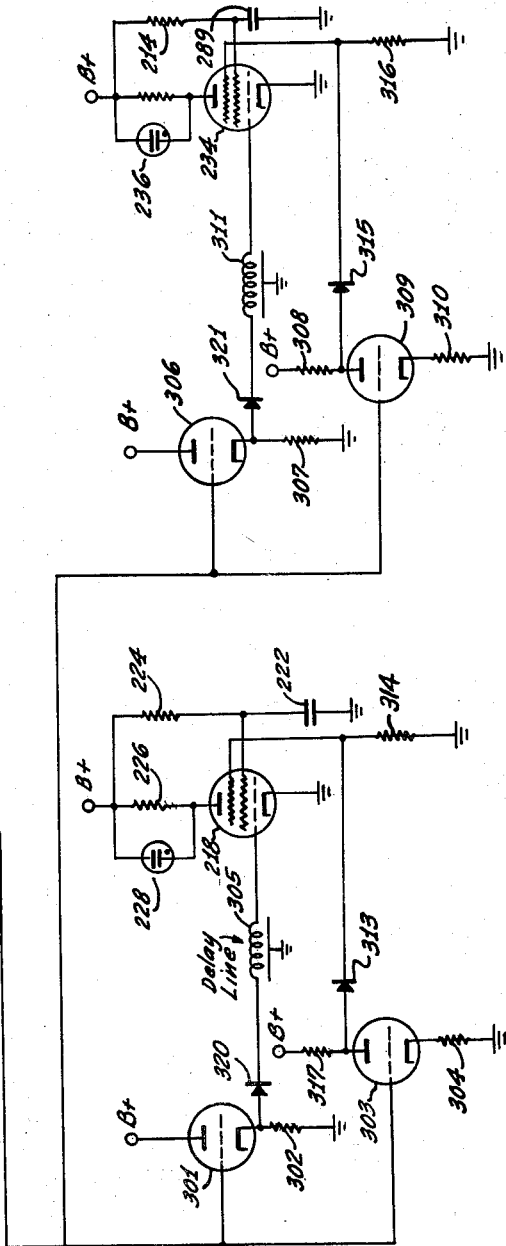
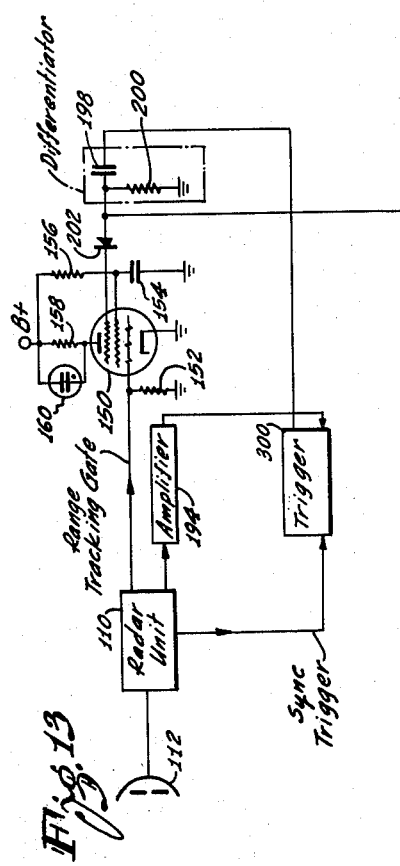
INVENTOR:
William E. Thornton
By Smyth, Roston & Pavitt
Attorneys sed Sept. 15, 1964

3,149,328
RADIANT ENERGY OBJECT LOCATING SYSTEM
William E. Thornton, Chapel Hill, N.C., assignor to Del Mar Engineering Laboratories, Los Angeles, Calif., a corporation of California
Filed Mar. 7, 1960, Ser. No. 13,391
16 Claims. (Cl. 343—13)

This is a continuation-in-part application of Serial No. 801,256, filed March 23, 1959, by William E. Thornton, for Radiant Energy Object Locating System, now abandoned.

The present invention relates to an improved scoring system for providing a record of the miss-distance between an airborne target and a projectile fired at the target.

Scoring systems of the general type with which the present invention is concerned are extremely useful for providing data concerning the fire control system of an aircraft in practice target attacks or in actual combat. Such scoring systems are also useful for providing data concerning the flight characterstics of missiles, rockets or other projectiles. Moreover, the systems are also useful in the training of the personnel of the aircraft.

Co-pending application Serial No. 610,140, which was filed September 17, 1956, now Patent No. 2,938,201, in the name of the present inventor, discloses a scoring system of the type discussed in the preceding paragraphs and which is useful for the purposes outlined above. The scoring system disclosed in the co-pending application combines radar and optical principles for assimilating the necessary data to determine the miss-distance between an airborne target and one or more projectiles fired at the target.

In the scoring system described in the co-pending application, a motion picture camera is mounted in an interceptor aircraft and information from the aircraft radar, or from a separate radar unit, is correlated with the optical image frames of the film strip drawn through the motion picture camera. This correlation provides range indicia for the image frames so as to identify the frame in which the range of the target from the firing point is the same as the range of the projectile. The identified frame is the one indicating the miss-distance of the projectile with respect to the target at the instant the projectile crosses the path of the target.

The system described in the co-pending application referred to above uses a camera which is fixed with respect to the aircraft, and which may have a relatively short focal length and a relatively large field of view. This particular system operates most satisfactorily when the firing range is relatively short. For relatively long firing ranges, however, the lens system of the camera should have a relatively long focal length so that the target area may be properly focused on the film strip in the camera. This requirement necessarily limits the field of view of the camera.

Co-pending application Serial No. 649,769, filed April 1, 1957, now Patent No. 2,983,915, in the name of the present inventor, discloses and claims a scoring system similar to the system described in the preceding paragraphs, but in which the optical system of the camera is slaved to the radar antenna of the aircraft. This enables the camera to be effectively locked on the target area when the radar antenna is locked on the target. The system of the co-pending application is well suited for use in conjunction with relatively long firing ranges, and it eliminates the need for extremely accurate maneuvering of the aircraft for such long ranges so to keep the camera trained on the target area.

It will become apparent as the present description proceeds that the teaching of the present invention is equally applicable to both of the types of systems referred to above. That is, the improved scoring system of the invention may be constructed to have a camera with a fixed optical system, or it may be constructed to include a camera with an optical system slaved to the radar antenna.

In each of the systems described in the co-pending applications, the radar system transmits radar pulses to the target and to the projectile which is fired at the target. Moreover, the radar system receives echo pulses from the target and from the projectile. These echo pulses are displayed in the systems of the co-pending applications as "pips" on the screen of a cathode ray tube oscilloscope, and the resulting display is recorded on the film strip in the motion picture camera through a special type of combining lens.

The systems of the co-pending applications have been constructed and have been found to operate with a high degree of satisfaction. The present invention, however, achieves the same high level of satisfactory operation, and with the elimination of certain components used in the systems of the co-pending cases. For example, several embodiments of the present invention which will be described make use of delay lines and coincident circuits to obtain pulses indicating when the target and the projectile pass through predetermined ranges with respect to the aircraft. These pulses are used to energize individual ones of a bank of glow discharge lamps. The glow discharge lamps are positioned so that their illumination may be introduced through the lens of the camera to the film strip in the motion picture camera. The resulting images on the film strip are correlated with the optical image frames of the film strip so as to provide relevant range information for the different frames.

The embodiments of the present invention to be described, therefore, provide the required range indicia on their respective film strips without the need, for example, of a cathode ray tube oscilloscope and its associated sweep circuits and high voltage power supply, and without the need for a special combining lens for the camera.

An important object of the invention, therefore, is to provide a new and improved radar optical scoring system which operates effectively and accurately, and yet which requires fewer and less expensive component parts than those required in the previous scoring systems of the same general type. The system of the invention is lighter, more compact and less expensive than the prior art systems. Yet, the system of the invention operates with the same high degree of accuracy as those of the co-pending applications referred to in the preceding paragraphs.

In the drawings:

FIGURE 1 shows a conventional jet interceptor aircraft having an access panel positioned at its forward end between the cockpit and nose of the aircraft, this panel serving as a convenient mounting means for the apparatus of the invention although it will become apparent as the description proceeds that the equipment may be mounted at any appropriate place in the aircraft;

FIGURE 2 is a sectional view of the access panel of FIGURE 1 taken substantially along the lines 2—2 of FIGURE 1, and this sectional view ilustrates in somewhat schematic form the various electronic and optical units which make up the apparatus used in the invention and which are mounted on the underside of the access panel;

FIGURE 3 is a side elevational view, partly in section, of a typical motion picture camera and its associated lens system, this camera being utilized in the system of the invention to provide an optical record of the target area and of the projectile fired at the target, this view also illustrating a side elevational view of a bank of glow discharge lamps which are positioned so that their illuminations may be directed through the lens of the camera and onto the film strip drawn through the camera;

FIGURE 4 is a view substantially on the line 4—4 of FIGURE 3 and showing a front elevational view of the bank of glow discharge lamps, the lamps being supported in an appropriate housing so as to form a unitary assembly;

FIGURE 5 is a sectional view of the glow discharge lamp unit, substantially on the line 5—5 of FIGURE 4, this view illustrating the means for supporting the glow discharge lamps and for supporting an appropriate lens for each of the lamps;

FIGURE 6 is a schematic representation of the system of the invention, and this representation is useful in explaining the operation of the invention;

FIGURE 7 is a fragmentary view of a composite film strip bearing visual information of the target area and also bearing radar-indicated range indicia of the target and projectiles fired at the target, the range indicia being formed by images of the illuminated lamps from the bank referred to above and which images appear on the film strip between successive image frames of the strip;

FIGURE 8 illustrates a selected frame from the film strip of FIGURE 7 to show how stadiometric measurements can be made from that frame;

FIGURE 9 is a further schematic showing of the various components which make up the system of the invention, and of the manner in which these components are directed to a target area to provide an optical record of the target and of the projectiles fired at the target, and further to provide an optical record of radar-derived range information concerning the target and the projectiles;

FIGURE 10 is a series of curves illustrating the operation of one of the components in the system of the invention and these curves are useful in explaining the operation of the system;

FIGURE 11 is a circuit diagram of one embodiment of the improved system of the invention;

FIGURE 12 is a circuit diagram of a second embodiment of the improved system of the invention; and FIGURE 13 is a circuit diagram of another embodiment of the invention.

Reference will now be made to the drawings for a detailed explanation of the system and apparatus of the invention. The interceptor aircraft 10 of FIGURE 1 has a usual access panel 12. This panel is mounted on top of the aircraft in front of the cockpit. In accordance with one embodiment of the invention, and as shown in FIGURE 2, the various components of the apparatus of the invention are mounted on the underside of a blister 13 secured to the access panel. As noted above, however, and as will become more apparent as the description proceeds, the components of the invention may be mounted at any other suitable position in the aircraft.

The apparatus of the embodiment of the invention shown in FIGURE 2 uses the main radar system of the aircraft. This main radar system is not shown, and it may be of any suitable known construction. As is well known, it is usual for an interceptor aircraft to be equipped with a main radar including a movable radar antenna. The radar system of the aircraft is capable of operation in several modes. In a first mode, the radar antenna is scanned through a particular azimuth and elevation so that a search may be made for a particular target. When the target has been discovered, the antenna may then be manually directed at the target and then locked on the target. The radar system then operates in what is usually termed "an attack" mode. During target lock-on, the radar antenna moves with changes in the relative positions of the target and the aircraft, so that the antenna is always maintained in a position such that it is directed at the target. It is also usual for present day radar systems utilized in interceptor aircraft to generate range tracking gates. These gates enable the system to track a particular target in range so that the radar antenna remains locked on the selected target, and any tendency for the antenna to lock on other targets in the vicinity is obviated.

Although the embodiment of the invention illustrated in FIGURE 2 is assumed to use the main radar system of the interceptor, as noted above, it will become evident as the description proceeds that the apparatus of the invention may incorporate its own radar system, if such is desired.

The components mounted in the blister 13 include a computer 30 which will be described in detail as the description proceeds. The computer 30 is coupled to the radar unit 110 (FIGURES 6 and 7 but not shown in FIGURE 1) of the aircraft and it serves to control the illumination of a bank of glow discharge, or neon, lamps, in a manner to be described. The apparatus of the invention also includes a motion picture camera 22. This camera may, for example, be of the usual 35 millimeter type, having a 4 inch lens 14 and a film speed of 20 frames per second. The camera is equipped with a usual lens system 24. The camera is mounted on the underside of the blister 13 by any suitable mounting means (not shown), and it is positioned so that its lens system 24 is directed upwardly toward a mirror element 26. The mirror element 26 is mounted in a cowl 28 formed in the blister 13. The mirror 26 is positioned to direct optical images of the field of view from the front of the aircraft to the lens system 24 of the camera. The camera is connected to a terminal 29 which is adapted to be connected to a suitable power source for driving the camera.

It will be appreciated that the embodiment of the invention presently being described utilizes a camera with a fixed optical system, and that system is directed optically at the field of view directly in front of the aircraft. However, and as mentioned previously, the optics of the camera 22 may be pivotally mounted, and may be slaved to the radar antenna in the manner described in the co-pending application 649,769 referred to above.

The components of the invention may be supported from the underside of the blister 13 by any suitable bracket means, as may the camera 22. Also, the interconnecting wiring between these components may be secured to the blister in accordance with well known switchboard mounting techniques. The dimensions and configuration of the blister are such that it can be interchangeably mounted to substantially all present jet interceptor aircraft. Therefore, the blister supporting the components of the invention constitutes a convenient means for enabling the invention to be installed in existing aircraft quickly and with a minimum of expense.

The mechanical details of the camera 22 are shown in FIGURE 3. The camera may be actuated by any suitable and conventional electric drive mechanism, and it operates in known manner to draw a film strip 50 intermittently from a reel 54 past a conventional shutter assembly 52 to a reel 56. The lens system 24 constitutes a normal objective lens for the camera; and the lens system may include, for example, a pair of convex lenses 57 and 58. These lenses are mounted in a usual lens barrel 60, and they are axially spaced along the barrel. The lenses 57 and 58 are constructed to focus optical images on the film strip 50 in successive image frames along the strip as it is drawn past the shutter assembly. A usual aperatured stop 62 is positioned between the lenses 57 and 58 in the lens barrel 60. The relative aperture of the lens system 24 may, for example, be $f/8$.

As illustrated in FIGURES 3, 4 and 5, a bank of glow discharge lamps, such as neon lamps, are mounted in a housing 80. This housing is mounted by any suitable bracket means in a position forward of the camera, and so that the illuminations of the discharge lamps may be directed through the lens system 24 to the film strip 54. As illustrated in FIGURE 4, for example, the housing 80 may be constructed to contain a group of five neon lamps designated 82, 84, 86, 88 and 90. Each of these lamps is mounted in a suitable socket 92, as shown in FIGURE 5, and these sockets are supported on a shelf 94 which, in turn, is mounted in the housing 80.

Appropriate electric connections are made to the neon lamps 82, 84, 86, 88 and 90 through corresponding pairs of leads, such as the leads 96 in FIGURE 4. Each of the neon lamps has a lens associated with it, and these lenses are designated 98, 100, 102, 104 and 106. The lenses are mounted in the housing 80 by an appropriate supporting means, and these lenses have an infinite focal length so that the illuminations from the different glow discharge lamps may be spotted on the film strip 50 of the camera without the need for critical tolerances in the positioning of the lamps. This, of course, applies only when the lens system of the camera itself is focused for an infinite focal length, which usually is the case.

As noted above, the components of the apparatus of the invention are illustrated in block form in FIGURE 6. The apparatus includes the computer 30, the camera 22 and the bank of neon lamps in the housing 80, as mentioned above. The apparatus also includes a radar unit 110 which, as mentioned, may be either the main radar system of the interceptor, or it may be a separate radar unit incorporated in the apparatus of the invention. The radar unit 110 is coupled to a radar antenna 112 of usual construction, and which is pivotally mounted to be capable of being locked on a selected target.

As mentioned previously, the units of FIGURE 6 may be mounted in a blister as described in conjunction with FIGURES 1 and 2. Alternately, the computer 30 may be conveniently mounted adjacent the fire control equipment of the aircraft. These components are also illustrated in FIGURE 9, and the latter view additionally shows the antenna 112 of the radar unit and the lens 14 of the camera 22 being directed at a target 120.

The operation of the system may best be explained by reference to FIGURES 6 and 9. The camera 22 and the radar unit 110 are mounted, for example, in an aircraft in the manner described above. A target, such as the target 120, may be of the usual airborne type and it may be towed by a towing aircraft using suitable towing equipment. Alternately, this target may, for example, be an enemy attacking aircraft. For the system of the invention to operate properly, it is merely necessary for the target to be optically visible to the camera 22, and to be radar reflective so as to be effectively "radar visible" to the radar unit 110.

When one or more projectiles, such as rockets or missiles, are fired by the interceptor at the target 120, the range between the interceptor and the projectiles increases as the projectiles move away from the aircraft and toward the target. At the same time, the range from the interceptor aircraft to the target decreases as the aircraft closes with the target. The camera 22 and the radar unit 110 may be controlled to be activated when the projectiles are fired by the aircraft at the target. The camera 22 records the optical images of the projectiles as they approach and pass the target. These optical images appear in successive optical image frames $A_1$, $A_2$, $A_3$ . . . on the film strip 50, as shown in FIGURE 7. At the same time, the radar unit 110 indicates the range of the projectiles and the target. The glow discharge lamps of FIGURES 4 and 5 are controlled in a manner to be described so that one or more of the lamps glows when the projectiles and the targets pass through predetermined ranges. The illuminations from these lamps are introduced through the lens system 24 of the camera 22 to the film strip 50, and these illuminations appear as indications between successive ones of the film frames, as illustrated by the indicia $B_1$, $B_2$, $B_3$ . . . of FIGURE 7.

As noted above, the range of the projectile increases as it travels toward the target, and the range of the target decreases as the aircraft closes with it. Then, as the projectile passes through predetermined ranges, and in a manner to be described, successive ones of the glow discharge lamps are illuminated, so that indicia appear on the film strip as one glow discharge lamp is illuminated after another due to the projectile passing through one predetermined range after another. These projectile indicia appear, for example, as marks extending along a diagonal path for successive film frames from one side of the film strip in FIGURE 7 to another. In like manner, indicia representing the passage of the target through predetermined ranges also appears on the film strip as one glow discharge lamp after another becomes illuminated. These target indicia may also extend along a diagonal path of the film strip which extends to cross the diagonal path of the projectile. The frame at which these diagonal paths intersect, then is the frame of range equality of the target and the projectile. That frame is designated by the arrow 8 in FIGURE 7, and is the frame $A_4$. That frame then carries the optical images of the target and the projectile at the instant the projectile crosses the path of the target.

As best shown in FIGURE 7, successive ones of the optical image frames $A_1$–$A_6$ on the film strip 50 photograph the target and the projectile as it is fired at the target by the aircraft so that the camera effectively follows the projectile as it approaches and passes the target. Without the radar range information, it is impossible to determine from the optical image frames alone which frame represents the projectile as it actually crosses the path of the target. However, by means of the indicia from the glow discharge lamps 82, 84, 86, 88 and 90, that particular frame can be determined.

In successive groups of the indicia $B_1$–$B_5$ of the film strip 50 in FIGURE 7, the images $b$ represent the radar derived illuminations from the glow discharge lamps representing the projectile as it passes through the predetermined ranges. As illustrated, the images $b$ effectively move from one of the frames $A_1$–$A_6$ to another along the film strip 50 in a path extending diagonally across the strip from its left side to its right side. Likewise, the images $c$ in the frames $A_1$–$A_6$ represent the illuminations from the glow discharge lamps as the target range decreases.

Because the target range is decreasing as the target is approached by the interceptor aircraft, the images $c$ move effectively in a diagonal path from one frame to the next across the film strip from its right hand side to its left hand side. The point at which the diagonal path of the images $b$ crosses the diagonal path of the images $c$ represents the optical image frame at which the target and projectile ranges or distances are equal. That is, this crossover point represents the instant that the projectile crosses the path of the target. This occurs in frame $A_4$ of FIGURE 7, and that frame is illustrated on an enlarged scale in FIGURE 8.

As shown in FIGURE 7, images $b$ and $c$ proceed along their respective diagonal paths from frame to frame, these images cross in the frame $A_4$. As illustrated, positioning of the images with respect to the optical image frames enables the crossover point of the two diagonal paths of the images to be found accurately, even though some of the radar indications may be lost. These diagonal paths are essentially linear over a material number of image frames of the film strip, so that it is possible to interpolate the diagonal paths over relatively short distances without introducing noticeable errors. It is therefore possible to determine the crossover point, even though some of the corresponding radar indications do not appear due to interference, or the like, which results in the non-activation of the lamps in the unit 80 and the resulting non-appearance of some of the images $b$ and $c$.

As will be described, the system of the invention in the described embodiments may include a redundancy circuit to provide the crossover indication at the frame $A_4$ independent of the provision of the other images as double check on the accuracy of the system.

As noted above, the optical image frame $A_4$ (corresponding to the crossover point between the diagonal paths of the $b$ and $c$ images) is an actual photograph of the target area at the instant the projectile crosses the path of the target. This particular image frame is shown on an enlarged scale in FIGURE 8. The frame $A_4$ includes an image T of the target and a second image P of the projectile as it crosses the path of the target. Then, assuming that the actual size of the target is known, the miss-distance between the target and the projectile can be calculated stadiometrically. That is, and with reference to FIGURE 8, where:

X is the unknown miss-distance in feet,
x is the image size of the unknown miss-distance, in inches,
D is the true length of the target in feet,
d is the image length of the target in inches.

Then the actual miss-distance is $$X = \frac{xD}{d}$$

If the target size is unknown, but the range, the focal length of the first section of the lens 24, the angle of departure, and the magnification of the film negatives, are all known; then the miss-distance (X) can be calculated by the following equation:

$$X = \frac{xR}{Mf(\sin\theta)}$$

where:
X is the miss-distance in feet,
x is the image size of the miss-distance in inches,
R is the range of the target and projectile at the crossover point in feet, as determined by the radar indications,
f is the focal length of the first section of the lens 24 in inches,
θ is the angle of departure of the attack from 90° with respect to the target,
M is the magnification of the film.

In the embodiment of the invention illustrated in FIGURE 11, the radar unit 110 is shown as associated with circuitry and blocks which go to make up the computer 30 described above. As noted, the radar unit 110 may be of any usual type, and it is constructed to develop a range tracking gate pulse which occurs in time coincidence with the echo pulses received from a selected target to which the radar antenna 112 is locked on. The range tracking gate pulses are introduced to the control grid of a pentode 150. The cathode of the pentode is grounded, and its control grid is connected to a grounded resistor 152. The screen grid of the pentode is connected to a grounded by-pass capacitor 154 and to a resistor 156. The resistor 156 connects with the positive terminal B+ of a source of unidirectional potential, and a resistor 158 is also connected to that source. The resistor 158 connects with the anode of the pentode 150, and is shunted by a glow discharge lamp 160. The glow discharge lamp may be of the usual neon type. The pentode 150 is connected as a coincident circuit, and it receives signals on its suppressor grid as will be described, and which signals are compared with the range tracking gate pulses introduced to its control grid.

The radar unit 110 periodically introduces pulses to the radar antenna 112 to be radiated out to the projectile and to the target. These transmitted pulses are regularly timed in accordance with known radar practice, and a sync trigger pulse is developed by the radar unit 110 each time a pulse is transmitted by the antenna 112. The sync trigger pulses are introduced to the control grid of a triode 162. The triode is connected as a cathode follower. The control grid of the triode is connected to a grounded resistor 164, and its cathode is connected to a grounded resistor 166. The anode of the triode 162 is connected to the positive terminal B+ of the source of unidirectional potential.

The cathode of the triode 162 is connected to the input terminal of a delay line 168. This delay line may have any usual construction, and it is terminated in its characteristic impedance, as represented by a grounded resistor 170. There are, therefore, no reflections in the delay line. The delay line 168 serves to delay the sync trigger pulses from the radar unit 110, and it has a plurality of intermediate taps, respectively corresponding to time delays of the sync trigger pulse which, in turn, represent predetermined ranges of the target and the projectile to which the transmitted radar pulses are directed.

Each of the intermediate taps of the delay line 168 is connected to a different one of a plurality of pentodes 172, 174, 176, 178 and 180. These pentodes are connected as coincident circuits, similar to the circuit of the pentode 150. The glow discharge lamps 82, 84, 86, 88 and 90 in the unit 80 of FIGURE 4 are connected in the respective anode circuits of the pentodes 172, 174, 176, 178 and 180. The intermediate taps of the delay line 168 are connected to the suppressor grids of the respective pentodes.

In accordance with known radar principles, the antenna 112 receives echo pulses from the target and from the projectile, and these echo pulses appear in the form of return video signals. At least a portion of the energy in the pulse transmitted from the radar unit i.e. the "main bang," inherently will be coincident with the sync trigger pulse, and the return video signals are introduced to an amplifier 194, and this amplifier is connected to the control grid of each of the pentodes 172, 174, 176, 178 and 180. The output from the amplifier 194 will thus be a curve similar to G in FIGURE 10 and will have a "main bang" pulse, a first echo pulse and a second echo pulse. These pentodes, and the pentode 150, may be of the type presently designated 6AS6.

The sync trigger output of the radar unit 110 is connected to the flip-flop 196 by any suitable means such as shown in FIGURE 12 to thereby introduce the sync trigger pulse to the flip-flop to thereby at least partially control the setting of the flip-flop 196. Such a pulse will be effective to always switch the flip-flop 196 to the second state each time a sync pulse occurs irrespective of the setting prior thereto. Thus, immediately following the "main bang" the flip-flop 196 will always be in the second state. The amplifier 194 which receives the return video signals has its output connected to at least one of the input terminals of the flip-flop 196 to be effective to feed the return signals into the flip-flop 196 and thereby at least partially control the setting of the flip-flop 196. The output may be connected by any conventional and well known manner or similar to FIGURE 12 so that the flip-flop 196 will always change its state to a different state whenever a return or echo pulse occurs. The flip-flop network 196 is a bi-stable network, and such networks are well known to the computer and other electronic arts. The flip-flop 196 may be triggered from its first to its second stable operating condition upon the introduction of a signal to its left input terminal. The flip-flop will then remain in its second operating condition, until a signal is introduced to its right input terminal to return it to its first operating condition. When the flip-flop is in its second operating condition, an output signal of one relative value appears at its right output terminal, and when the flip-flop is returned to its first operating condition, the signal at its right output terminal will be returned to another relative level.

The right output terminal of the flip-flop 196 is connected to a capacitor 198 which, in turn, connects with a grounded resistor 200 and with the anode of a diode 202. The cathode of the diode 202 is connected to the suppressor grid of the pentode 150. The capacitor 198 and the resistor 200 are connected as a differentiator. This differentiator functions to produce a positive polarity pulse when the flip-flop 196 is triggered to its first stable operating condition, and to produce a negative polarity pulse when the flip-flop is triggered to its second operating condition.

Each time the radar unit 110 transmits a pulse from the radar antenna 112, it develops a sync trigger pulse, as mentioned above and as illustrated by the curve A in FIGURE 10. The sync trigger output of the radar unit 110 is connected to the flip-flop 196 in any well known and conventional manner or similar to FIGURE 12 so that the sync trigger signal will be effective to always switch the flip-flop 196 to its second operating state as shown by the curve H of FIGURE 10 irrespective of the state of the flip-flop prior thereto. The sync trigger is also passed by the cathode follower 162 to the delay line 168. Then, the pulse appears at the different taps of the delay line with the delays illustrated in the curves B, C, D, E and F respectively. These pulses are respectively introduced to the pentodes 172, 174, 176, 178, and 180. Likewise, the echo pulses received from the target and from the projectile are passed through the amplifier 194 and are introduced to the control grid of each of these pentodes.

Whenever the projectile, for example, passes through a range corresponding to the predetermined range represented by the pulses at the tap 1 of the delay line 168, its echo pulse from the amplifier 194 will appear in time coincidence with the pulse at the tap 1, so that the glow discharge lamp 82 will be energized. This will provide an indication, such as shown in FIGURE 7 on top of the image frame $A_2$. Likewise, as the presently more distant target passes through a predetermined range, corresponding to the timing of the pulses at the tap 5 of the delay line, its echo pulses passed by the amplifier 194 will cause the lamp 90 to glow to provide the indication $c$ shown in FIGURE 7 adjacent the optical frame $A_2$. Then, as the target range decreases and the projectile range increases, successive ones of the lamps 84, 86 and 88 will be energized to provide the subsequent indications of FIGURE 7.

The return video from the radar unit 110 also is introduced to the flip-flop 196. As noted above, the sync trigger always triggers the flip-flop 196 to its second operating state. However, the echo pulses from the projectile, a target or any spurious source will always be effective to switch the state of the flip-flop 196 each time such an echo pulse occurs. In the event the flip-flop 196 remains in the second state following the receiving of a pair of pulses from the projectile and the target, it will be in the second state at the time of the sync pulse and it will remain there. However, if an echo is received from only the projectile and not the target, or if an addition echo is received following the two echoes from the projectile and target, the flip-flop 196 will be in its first state prior to the sync signal substantially as shown in curve H of FIGURE 10. The sync pulse will then switch the flip-flop 196 to its second state. As may be seen from the curves G and H of FIGURE 10, the echo pulses from the projectile return the flip-flop to its first state, so long as they occur before the target pulses. If the echo pulses from the projectile reach the radar unit 110 after the echo pulses from the target, the target pulses trigger the flip-flop to its first state. The output signal from the flip-flop is differentiated by the differentiator 198, 200 (as mentioned above) to provide output pulses as shown by the curve J of FIGURE 10.

As noted, so long as the projectile has not yet reached the path of the target, each of the projectile echo pulses will return the flip-flop 196 to its first operating state, and the resulting differentiated positive output pulses from the differentiator do not occur in time coincidence with the range tracking gate pulse of the curve K. Therefore, the pentode 150 does not become conductive when the projectile echo pulse precedes the target echo pulse. However, when the projectile range first equals the target range, as represented by the instant the projectile crosses the path of the target, the flip-flop is triggered to its first state in time coincidence with the range tracking gate pulse of curve K of FIGURE 10. This causes the resulting positive pulse from the differentiator 198, 200 to render the pentode 150 conductive to cause the lamp 160 to glow. The latter lamp may be used to provide a separate indicia on the film strip as a redundancy check identifying the frame of range equality, and which may be uesd in conjunction with the crossover diagonal paths of the glow discharge lamps described above as a redundancy check. For this purpose the lamp 160 may be positioned adjacent the unit 80 in FIGURE 3 so that its illumination may be introduced to the film strip 50 at any suitable distinctive position on the film strip adjacent the film frame it is to identify.

In the embodiment described in reference to FIGURE 11, an indication is provided of the instant of range equality of the target and the projectile. In the embodiments illustrated in FIGURES 12 and 13, in addition to the indication of range equality, indications are provided when the range between the projectile and target is at predetermined values. The embodiment of FIGURE 12 utilizes circuitry similar to the circuitry of the embodiment of FIGURE 11 in order to illuminate the discharge lamp 160 upon the instant of range equality of the target and the projectile. For that reason, the various components in FIGURE 12 which are similar to those used in FIGURE 11 have been designated by the same numerals. The amplifier 194 is connected to two gates 295 and 297. The gate 295 is in a disabled condition when the flip-flop circuit 196 is in its reset or first condition and it becomes enabled to permit the passage of a pulse from the amplifier 194 when the flip-flop circuit 196 is in its set or second condition. The gate 297 is enabled when the flip-flop circuit 196 is reset and disabled when the flip-flop circuit 196 is set. The flip-flop circuit 196 in FIGURE 12 is somewhat different than that in FIGURE 11 because its output potential is relatively positive when it is in its reset condition and relatively negative when it is in its set condition. The converse is true in FIGURE 11.

The two gates 295 and 297 function effectively as a switch to steer the successive two pulses from the amplifier 194 first to the set terminal of the flip-flop circuit 196 and then to its reset terminal. Actually, the two gates 295 and 297 and the flip-flop circuit 196 together form a trigger arrangement which is conventional in the art. In such an arrangement, successive pulses to the same input (common input to gates 295 and 297) trigger the arrangement to alternate states. A pulse to a different input (from unit 110) sets it to one particular state if it is at the other state. The circuit 196 in FIGURE 11 could also be such a trigger arrangement with the operation of the system being quite similar except that the circuit 196 is set to its second state by the second echo pulse at its right input. The synch pulse then merely insures that it is at the second state.

Returning now to FIGURE 12, the synchronization pulse from the radar unit 110 is coupled directly to the reset terminal of the circuit 196 to insure that it is reset when each pulse is transmitted from the radar antenna 112. With the circuit 196 in FIGURE 12 reset, the first pulse from the amplifier 194 passes through the gate 297 to the set terminal of the circuit 196. When the circuit 196 sets, it provides a relatively negative potential at its output terminal to reverse the conditions of the gates 295 and 297 and develop a negative pulse at the differentiator circuit. The second pulse from the amplifier 194 passes through the gate 295 to reset the flip-flop circuit 196.

The negative pulse developed by the differentiator circuit is coupled through an inverter 298 to the tube 150. The discharge lamp 160, accordingly, provides an indication of the instant of range equality of the projectile and the target.

The delay line 168 of FIGURE 11 and its associated circuitry have been replaced by a pair of delay lines 201 and 203 in FIGURE 12. These delay lines have different selected delays corresponding to two different predetermined range differences of the projectile and the target with respect to the attacking aircraft. The delay lines 201 and 203 are terminated in impedances, such as a pair of grounded resistors 204 and 206 respectively, and the values of these terminating impedances are not equal to the characteristic impedance of the respective delay lines. Therefore, reflections occur in the delay lines and a positive pulse is reflected back to the input terminal of each delay line in response to a negative pulse introduced to the corresponding delay line.

The junction of the differentiator resistor 200 and the anode of the diode 202 is connected to a disabling gate 291. The gate 291 is enabled when an associated flip-flop circuit 299 is in its reset condition. The flip-flop circuit 299 is reset by the synchronization trigger pulse from the radar unit 110 through a pulse shaper 292 so that the gate 291 permits the passage of the pulse from the differentiator. The negative pulse from the differentiator is also provided through a diode 293 to the set terminal of the flip-flop circuit 299 causing it to trigger to its set condition. When the circuit 299 is triggered to its set condition, it enables a gate 294 and it disables the gate 291. The gate 291 becomes disabled to inhibit the passage of pulses in either direction. The negative pulse from the differentiator, however, passes through the gate 291 before it becomes disabled.

The gate 291 is connected to the cathode of a diode 208 and to the cathode of a diode 212. The anode of the diode 208 is connected to the input terminal of the delay line 201 and to the anode of a diode 216. The cathode of the diode 216 is connected to the control grid of a pentode 218. This pentode may be of the type presently designated 6AS6, and it is connected as a coincident circuit. The control grid of the pentode 218 is connected to a grounded resistor 220, and the cathode of the pentode is grounded. The screen grid of the pentode 218 is connected to a grounded by-passing capacitor 222 and to a resistor 224. The anode of the pentode is connected to the positive terminal B+ of the source of unidirectional potential. A glow discharge tube 228 is shunted across the resistor 226.

The anode of the diode 212 is connected to the input terminal of the delay line 203 and to the anode of a diode 232. The cathode of the diode 232 is connected to the control grid of a pentode 234. The pentode 234 is connected as a coincident circuit, and its associated circuitry may be similar to the circuitry of the pentode 218. A glow discharge tube 236 is included in the anode circuit of the pentode 234. The anode of the diode 214 is connected to the suppressor grid of the pentode 234.

The differentiating circuit 198, 200 develops a negative polarity pulse when the flip-flop 196 is triggered to its set or second state and a positive polarity pulse when the flip-flop is triggered back to its reset or first state. So long as the projectile has not yet reached the path of the target, the differentiating network 198-200 produces a negative pulse for each projectile echo pulse and a positive pulse for each target echo pulse, the timing between these two pulses decreasing as the projectile approaches the path of the target. Then, after the projectile has passed the path of the target, the differentiating network is caused to produce a positive pulse for each projectile echo pulse and a negative pulse for each target echo pulse. The latter condition obtains because the target pulses now occur before the projectile echo pulses, so that the triggering of the flip-flop 196 is reversed with respect to the two sets of echo pulses.

The negative polarity pulses from the differentiator are passed through the diodes 208 and 212 to the delay lines 201 and 203. The positive polarity pulses, on the other hand, are introduced through the now enabled gate 294 to the anodes of two diodes 210 and 214. The diodes 210 and 214 are connected respectively to the suppressor grids of the tubes 218 and 234 and to grounded resistors 230 and 289. The positive pulse from the gate 294, accordingly, passes through the diodes 210 and 214 to the suppressor grids of the pentodes 218 and 234. The positive polarity reflected pulses from the delay lines are passed through the diodes 216 and 232 respectively to the control grids of the corresponding pentodes 218 and 234.

Considering the time interval during which the projectile has not yet reached the path of the target, the negative polarity echo pulse from the projectile is passed into the delay lines 201 and 203, and the positive polarity echo pulses from the target are passed to the suppressor grids of the pentodes. When the timing between a negative polarity differentiated projectile pulse has a predetermined value with respect to the timing of the positive polarity differentiated target pulse, the reflected pulse from the delay line 201 occurs in time coincidence with the target pulse so that the pentode 218 becomes conductive to illuminate the glow discharge tube 228. Likewise, when a differentiated projectile pulse has a predetermining timing with respect to the positive polarity differentiated target pulse, the glow discharge 236 is caused to glow.

Therefore, the glow discharge tube 228 is caused to glow when the target and projectile have a first predetermined relative range, the glow discharge tube 236 is caused to glow when the projectile and target have a second smaller predetermined relative range, and the glow discharge tube 160 is caused to glow at the moment of range equality. The illuminations from these discharge tubes are introduced through the lens system of the camera in a manner similar to that described in conjunction with FIGURE 3 to cause corresponding indicia to identify the proper film frames.

In like manner, when the projectile has passed the path of the target, the tubes 228 and 236 again are caused to glow when the relative ranges of the projectile and target again reach the predetermined value. Therefore, and in a manner similar to that described in conjunction with FIGURE 11, the glow discharge tubes of FIGURE 12 may be caused to provide indicia patterns on the film strip 50 so that the film frame of range equality can be properly plotted and identified.

As indicated above, the embodiment illustrated in FIGURE 13 also provides indications of the predetermined relative ranges of the projectile and target. Components similar to those utilized in FIGURES 11 and 12 have been given similar reference designations. The circuitry for energizing the tube 160 is the same as described above in reference to FIGURE 11 except that a trigger circuit 300 is utilized in which successive pulses to the right input trigger it to alternate states and a pulse to the left input triggers it to one particular state if it is in the other. Such an arrangement is similar to the flip-flop 196 in FIGURE 11.

The differentiated pulses are coupled through cathode follower tubes 301 and 306 respectively to delay lines 305 and 311. The tube 301 has a cathode connected to ground by a cathode resistor 302, and an anode connected directly to B+. Similarly, the tube 306 has a cathode connected to ground by a cathode resistor 307 and an anode connected directly to B+. The two delay lines 305 and 311 provide for different predetermined delays to the control grids of tubes 218 and 234. The tubes 218 and 234 function exactly as do the similarly designated tubes in FIGURE 12. The suppressor grids are positively biased by the negative pulse from the differentiator. The negative pulse is inverted by the inverter tubes 303 and 309. The anodes of the tubes 303 and 309 are coupled respectively to B+ by anode resistors 317 and 308, and the cathodes are coupled respectively to ground by resistors 304 and 310.

The inverted or positive pulses at the anodes of the tubes 303 and 309 are coupled respectively through diodes 313 and 315 across grounded resistors 314 and 316. The resistors 314 and 316 are connected respectively to the suppressor grids of the tubes 218 and 234. A coincidence of positive pulses at the control and suppressor grids of either tube 218 or 234 gates the tube and energizes its associated neon lamp. The delay provided by the delay lines 305 and 311, which may be manually adjustable, determines the range between the projectile and target for gating the associate tubes 218 or 234 to energize the associated lamps 228 or 236.

In this manner, the radar system of the present invention tracks one or more rockets or missiles outbound in range and also tracks the target inbound in range, with appropriate representations of the ranges of the rockets and of the target being displayed as converging luminous spots on the film strip, with the spots being adjacent corresponding film frames of the film strip 50. Then, the point at which these spots merge as one is the point at which the projectile and target are coincidence in range.

As described above, the range coincident point may also be identified in the system of the invention by an independent redundancy circuit which responds solely to such range equality to provide the desired indication.

The camera component of the system of the invention is linked with the computed radar data by the described means, and this results in a series of composite pictures on a single film strip of the target area and of the computed range indicia. This correlation of the computed radar information with the optical information enables a particular optical image frame of the film strip to be selected and used in determining the actual miss-distance between the target and the rocket.

As noted previously, the apparatus of the invention is relatively light and compact. Several expensive and relatively heavy and bulky components of usual systems of this type have been eliminated. The eliminated components include, for example, a separate cathode-ray oscilloscope and its necessary associated elements, and also the need for a particularly constructed combining lens for the camera. As described, the components of the invention may be conveniently mounted in a blister secured to any convenient part of the aircraft. However, the various components of the apparatus of the invention can be mounted at any convenient place in the aircraft.

As described above, the accuracy of the invention is not impaired even in the presence of poor radar operating conditions. This latter feature is achieved by the capabilities of the system to plot ranges over a relatively long time interval, so that any lost radar indications may be interpolated in the described manner. Also, the control circuit which provides an indication for range equality is properly correlated with the plotting circuit to provide a redundancy check on the frame selected as the one illustrating the actual instant the projectile crosses the path of the target.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A scorer system for indicating the miss-distance between a target and at least one projectile fired at the target from a firing point, said system including: motion picture camera means, means for mounting said camera means in a position at the firing point so that the camera means may be directed at the target to enable the camera means to record in successive film frames on a film strip drawn therethrough optical images showing the motions of the target and of the projectile as viewed from the firing point, radar means for transmitting a succession of radar signal pulses at the projectile and at the target and for receiving a corresponding succession of echo signal pulses from the target and from the projectile, means for generating at least one pulse for each of the transmitted radar pulses and having a predetermined time relation with respect thereto, means coupled to the generating means and responsive to the pulses therefrom to detect selected ones of the echo pulses received from the target and from the projectile, and means coupled to the detecting means and responsive to the echo signal pulses detected thereby to identify the optical image frame of the film strip which indicates the distance between the target and the projectile at the instant the projectile crosses the path of the target.

2. A scorer system for use in an aircraft for indicating the miss-distance between a target and at least one projectile fired at the target from the aircraft, said system including: motion picture camera means, means for mounting the camera means in a position in the aircraft so that the camera means may be directed at the target to enable the camera means to record in successive film frames on a film strip drawn therethrough optical images showing the motions of the target and of the projectile as viewed from the aircraft, radar means mounted in the aircraft for transmitting a succession of radar signal pulses at the projectile and at the target and for receiving a corresponding succession of echo pulses from the target and from the projectile, said radar means generating a series of synchronizing pulses having a predetermined time relation with respect to corresponding ones of the transmitted radar signal pulses, delay means coupled to the radar means and responsive to the synchronizing pulses for developing at least one delayed pulse in response to each of the synchronizing pulses and having a predetermined time relation with respect thereto, means coupled to the delay means and to the radar means and responsive to the delayed pulses from the delay means to detect selected ones of the echo signal pulses from the target and from the projectile, and means coupled to the detector means and responsive to the echo signal pulses detected thereby to identify the optical image frame of the film strip which indicates the distance between the target and the projectile at the instant the projectile crosses the path of the target.

3. A scorer system for use in an aircraft for indicating the miss-distance between a target and at least one projectile fired at the target from the aircraft, said system including: motion picture camera means, means for mounting the camera means in a position in the aircraft so that the camera means may be directed at the target to enable the camera means to record in successive film frames on a film strip drawn therethrough optical images showing the motions of the target and of the projectile as viewed from the aircraft, radar means mounted in the aircraft for transmitting a succession of radar signal pulses at the projectile and at the target and for receiving a corresponding succession of echo pulses from the projectile and from the target, said radar means generating a series of synchronizing pulses having a predetermined time relation with respect to corresponding ones of the transmitted radar pulses, delay means coupled to the radar means and responsive to the synchronizing pulses for developing at least one delayed pulse in response to each of the synchronizing pulses and having a predetermined time relation with respect thereto, coincident circuit means coupled to the delay means and to the radar means for producing an output signal upon the coincident occurrence of an echo pulse from the radar means and a delayed pulse from the delay means, and indicator means coupled to the coincident circuit means and responsive to the output signals therefrom for providing indications on the film strip thereby to identify the optical image frame thereof which indicates the distance between the target and the projectile at the instant the projectile crosses the path of the target.

4. A scorer system for indicating the mass-distance between a target and at least one projectile fired at the target from a firing point, said system including: motion picture camera means, means for mounting the camera means in a position at the firing point so that the camera means may be directed at the target to enable the camera means to record in successive film frames on a film strip drawn therethrough optical images showing the motions of the target and of the projectile as viewed from the firing point, radar means for transmitting a succession of radar signal pulses at the projectile and at the target and for receiving a corresponding succession of echo pulses from the projectile and from the target, said radar means generating a series of synchronizing pulses having a predetermined time relation with respect to the transmitted radar pulses, time delay means coupled to the radar means and responsive to the synchronizing pulses therefrom for developing a plurality of delayed pulses in response to each of the synchronizing pulses and each having a predetermined time relation with respect thereto, a corresponding plurality of coincident circuits coupled to the delay means and to the radar means for individually providing output signals upon the coincident occurrence of the echo pulses from the radar means and corresponding ones of the delay pulses from the delay means, a corresponding plurality of glow indicator means respectively coupled to said coincident circuits to be illuminated in response to the respective output signals developed thereby, and means for introducing the illumination from respective ones of the indicator means to the film strip to identify the optical image frame thereof which indicates the distance between the target and the projectile at the instant the projectile crosses the path of the target.

5. The combination defined in claim 4 and in which said delayed pulses have a predetermined time delay with respect to the synchronizing pulses corresponding to predetermined ranges from the firing point, and in which individual ones of said indicator means are positioned to provide range indications of the target and of the projectile for successive film frames of the film strip.

6. The combination defined in claim 4 and in which said delayed pulses have a predetermined time delay with respect to the synchronizing pulses corresponding to predetermined ranges from the firing point, and in which individual ones of said indicator means are positioned to provide a plurality of indications adjacent successive film frames of the film strip, said indications revealing the image frames at which the target and projectile pass through the predetermined ranges.

7. The combination defined in claim 4 and in which said delayed pulses have a predetermined time delay with respect to the synchronizing pulses corresponding to predetermined ranges from the firing point, in which individual ones of said indicator means are positioned to provide a plurality of indications adjacent successive film frames of the film strip, said indications revealing the image frames at which the target and projectile pass through the predetermined ranges, and in which the target indications progress on a first diagonal path along the film strip and in which the projectile indications progress on a second diagonal path along the film strip, the first and second diagonal paths crossing at the optical image frame representing the instant the projectile passes the path of the target.

8. The combination defined in claim 4 and in which the radar means generates a series of range tracking gate pulses occurring in time coincidence with corresponding ones of the target echo pulses, and which includes circuit means for producing an output signal indicative of time coincidence between the projectile echo pulses and the range tracking gate pulses, indicator means coupled to the last mentioned circuit means to be illuminated in response to the output signals therefrom, and means for introducing the illumination from the last mentioned indicator means to the film strip to identify said optical image frame which indicates the distance between the target and the projectile when the projectile crosses the path of the target.

9. The combination defined in claim 4 and in which the radar means generates a series of range tracking gate pulses occurring in time coincidence with corresponding ones of the target echo pulses, and which includes a flip-flop network having a first stable operating state and a second stable operating state, circuit means for triggering the flip-flop to its second stable operating state in response to individual ones of the echo pulses from the projectile and for returning the flip-flop to its first stable operating state in response to individual ones of the echo pulses from the target, differentiating circuit means for deriving a pulse of a predetermined polarity each time the flip-flop is triggered to its second operating state, coincident circuit means for producing an output signal indicative of time coincidence between the pulses of the predetermined polarity from the differentiating circuit means and the range tracking gate pulses, indicator means coupled to the last mentioned coincident circuit means to be illuminated in response to the output signals therefrom, and means for introducing the illumination from the last mentioned indicator means to the film strip to identify said optical image frame which indicates the distance between the target and the projectile when the projectile crosses the path of the target.

10. A scorer system for indicating the miss-distance between a target and at least one projectile fired at the target from an aircraft, said system including: motion picture camera means, means for mounting the camera means in a position in the aircraft so that the camera means may be directed at the target to enable the camera means to record in successive film frames on a film strip drawn therethrough optical images showing the motions of the target and of the projectile as viewed from the aircraft, radar means for transmitting a succession of radar pulses at the projectile and at the target and for receiving a corresponding succession of echo pulses from the projectile and from the target, a flip-flop network having a first stable operating state and a second stable operating state, circuit means coupled to the radar means for triggering the flip-flop to its second stable operating state in response to individual ones of the echo pulses from the projectile and for returning the flip-flop to its first operating state in response to individual ones of the echo pulses from the target until the projectile crosses the path of the target and for triggering the flip-flop to its second operating state in response to the echo pulses from the target and for returning the flip-flop to its first state in response to the echo pulses from the projectile after the projectile crosses the path of the target, differentiating circuit means for producing a pulse of a predetermined polarity each time the flip-flop is triggered to its second stable operating state, delay means coupled to the differentiating circuit means for producing a pulse in response to each of the pulses of said predetermined polarity having a predetermined time delay with respect thereto, coincident circuit means coupled to the differentiating circuit means and to the delay means for producing an output pulse for each coincident occurrence of one of the predetermined polarity pulses and one of the delayed pulses, glow indicator means coupled to the coincident circuit means to be energized in response to the output pulses produced thereby, and means for introducing illuminations from the glow indicator means to the film strip to identify the optical image frame thereof which indicates the distance between the target and the projectile at the instant the projectile crosses the path of the target.

11. The combination defined in claim 10 and in which the radar means generates a series of range tracking gate pulses occurring in time coincidence with corresponding ones of the target echo pulses, and which includes circuit means coupled to the radar means and to the differentiating circuit means for producing an output signal indicative of time coincidence between the predetermined polarity output pulses from the differentiating circuit means and the range tracking gate pulses, indicator means coupled to the last mentioned circuit means to be illuminated in response to the output signal therefrom, and means for introducing the illumination from the last mentioned indicator means to the film strip to identify said optical image frame which indicates the distance between the target and the projectile when the projectile crosses the path of the target.

12. A scorer system for indicating the miss-distance between a target and at least one projectile fired at the target from an aircraft, said system including: motion picture camera means, means for mounting the camera means in position in the aircraft so that the camera means may be directed at the target to enable the camera means to record in successive film frames on a film strip drawn therethrough optical images showing the motions of the target and of the projectile as viewed from the aircraft, radar means for transmitting a succession of radar pulses at the projectile and at the target and for receiving a corresponding succession of echo pulses from the projectile and from the target, a flip-flop network having a first stable operating state and a second stable operating state, circuit means coupled to the radar means for triggering the flip-flop to its second stable operating state in response to individual ones of the echo pulses from the projectile and for returning the flip-flop to its first operating state in response to individual ones of the echo pulses from the target before the projectile crosses the path of the target and for triggering the flip-flop to its second state in response to individual ones of the target echo pulses and for returning the flip-flop to its first state in response to the individual ones of the projectile echo pulses after the projectile has crossed the path of the target, differentiating circuit means for producing a pulse of a predetermined polarity each time the flip-flop is triggered to its second stable operating state, a plurality of delay lines coupled to the differentiating circuit each having different time delay characteristics, said delay lines each producing a delayed pulse in response to each of the pulses of said predetermined polarity produced by the differentiating circuit, a corresponding plurality of coincident circuits coupled to respective ones of the delay lines and to the differentiating circuit means, each of the coincident circuits producing an output pulse for each coincident occurrence of one of the predetermined polarity pulses and one of the corresponding delayed pulses, a corresponding plurality of glow indicators coupled to the two respective ones of the coincident circuits to be energized in response to the corresponding output pulses produced thereby, and means for introducing the illuminations from the glow indicators to the film strip to identify the optical image frame thereof which indicates the distance between the target and the projectile at the instant the projectile crosses the path of the target.

13. A scorer system for indicating the miss-distance between a target and at least one projectile fired at the target from a firing point, said system including: motion picture camera means, means for mounting said camera means in a position at the firing point so that the camera means may be directed at the target to enable the camera means to record in successive film frames on a film strip drawn therethrough optical images showing the motions of the target and of the projectile as viewed from the firing point, radar means for transmitting a succession of radar pulses at the projectile and at the target and for receiving a corresponding succession of echo signal pulses from the target and from the projectile, control means coupled to the radar means for providing a succession of output pulses as the projectile and as the target pass through predetermined ranges from the firing point, means coupled to the control means and responsive to the output pulses therefrom to provide target and projectile range indicia for the optical image frames of the film strip, further control means coupled to the radar means for providing an output pulse upon range equality of the target and the projectile from the firing point, and means coupled to the further control means and responsive to the output pulse therefrom to provide an indicia for indicating the optical image frame which indicates the distance between the target and the projectile when the projectile crosses the path of the target.

14. A scorer system for indicating the miss-distance between a target and at least one projectile fired at the target from a firing point, said system including: motion picture camera means, means for mounting said camera means in a position at the firing point so that the camera means may be directed at the target to enable the camera means to record in successive film frames on a film strip drawn therethrough optical images showing the motions of the target and of the projectile as viewed from the firing point, radar means for transmitting a succession of radar pulses at the projectile and at the target and for receiving a corresponding succession of echo pulses from the target and from the projectile, delay means coupled to the radar means for producing a succession of delayed pulses having a predetermined time delay with respect to corresponding pulses of one of the successions of pulses from the radar means, coincident circuit means coupled to the delay means and to the radar means for producing output pulses upon the time coincidence of the delayed pulses with corresponding pulses of another of the successions of pulses from the radar means, and means coupled to the coincident circuit means and responsive to the output pulses therefrom to provide range indicia for the optical frames of the film strip.

15. The combination defined in claim 14 and in which the radar means generates a series of range tracking gate pulses occurring in time coincidence with corresponding ones of the target echo pulses, and which includes coincident circuit means for producing an output pulse indicative of time coincidence between the projectile echo pulses and the range tracking gate pulses, indicator means coupled to the last mentioned coincident circuit means and responsive to the output pulses therefrom to provide indicia for indicating the optical image frame which indicates the distance between the target and the projectile when the projectile crosses the path of the target.

16. In combination for use in a scorer system for indicating the miss-distance between a target and at least one projectile fired at the target, radar means for transmitting a succession of radar pulses at the projectile and at the target and for receiving a corresponding succession of echo pulses from the projectile and from the target, delay means coupled to the radar means for developing at least one succession of delayed pulses having a predetermined time delay with respect to the echo pulses from the projectile before the projectile crosses the path of the target and having a predetermined time delay with respect to the echo pulses from the target after the projectile has crossed the path of the target, coincident circuit means coupled to the radar means and to the delay means for producing output pulses upon the time coincidence of the delayed pulses with the echo pulses from the target before the projectile crosses the path of the target and for producing output pulses upon the time coincidence of the delayed pulses with the echo pulses from the projectile after the projectile has crossed the path of the target, and means coupled to the coincident circuit means and responsive to the output pulses therefrom to provide range indicia indicating the miss-distance between the projectile and the target.

References Cited in the file of this patent
UNITED STATES PATENTS
3,030,620    Roberts et al. _____ Apr. 17, 1962